United States Patent
Ohzawa et al.

(10) Patent No.: US 6,803,884 B1
(45) Date of Patent: Oct. 12, 2004

(54) PROJECTION IMAGE DISPLAY DEVICE

(75) Inventors: Soh Ohzawa, Toyonaka (JP); Yasushi Tanijiri, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/521,657

(22) Filed: Mar. 8, 2000

(30) Foreign Application Priority Data

Mar. 11, 1999 (JP) .......................................... 11-064489

(51) Int. Cl.[7] .............................................. G09G 5/00
(52) U.S. Cl. .............................. 345/1.1; 345/1.3; 345/8
(58) Field of Search ............................. 345/1.1, 1.3, 9, 345/7, 8; 359/364, 630; 352/57, 364; 351/206

(56) References Cited

U.S. PATENT DOCUMENTS

| | | | | |
|---|---|---|---|---|
| 5,184,956 A | * | 2/1993 | Langlais et al. ............... 434/69 |
| 5,844,713 A | * | 12/1998 | Namba et al. ............... 359/364 |
| 6,040,945 A | * | 3/2000 | Karasawa .................... 359/630 |
| 6,084,654 A | * | 7/2000 | Toporkiewicz et al. ....... 352/57 |
| 6,085,112 A | * | 7/2000 | Kleinschmidt et al. .. 455/556.1 |
| 6,137,456 A | * | 10/2000 | Bhagavatula et al. ....... 345/103 |
| 6,195,068 B1 | * | 2/2001 | Suzuki et al. ................. 345/2.2 |
| 6,222,507 B1 | * | 4/2001 | Gouko ...................... 345/1.1 |
| 6,227,667 B1 | * | 5/2001 | Halldorsson et al. ........ 351/206 |
| 6,275,714 B1 | * | 8/2001 | Kintz et al. ................. 455/566 |

* cited by examiner

*Primary Examiner*—Dennis-Doon Chow
(74) *Attorney, Agent, or Firm*—Burns, Doane, Swecker & Mathis, L.L.P.

(57) ABSTRACT

A projection image display device has a first display unit for displaying a first image based on a first image signal, an enlarging optical system for enlarging the first image and projecting the first image to the eye of an observer and a second display unit for displaying a second image based on a second image signal and directly projecting the second image to the eye of an observer.

23 Claims, 5 Drawing Sheets

PROJECTION IMAGE DISPLAY DEVICE

CROSS-REFERENCE TO RELATED APPLICATIONS

This application is based on patent application No. 11-64489 filed in Japan, the content of which is hereby incorporated by reference.

BACKGROUND OF THE INVENTION

1. Field of the Invention

The present invention relates to a projection image display device disposed in front of the eyes of an observer, and specifically relates to an image display device providing a wide viewing angle image.

2. Description of the Related Art

Projection image display devices used in front of the eyes of an observer are either head-mounted displays or hand-held displays. This type of projection image display device is provided with a enlarging optical system to provide a wide field of view image having a high sense of realism, and enlarges a projection image displayed on a display unit and projects this image as a virtual image on the eye of an observer.

For example, U.S. Pat. No. 5,844,713 discloses a projection image display device providing a plurality of display units in an array and which enlarges the projection image displayed on all display units via a single enlarging lens. Projection image display devices are known wherein display units and enlarging lens units are arranged in a plurality of arrays to individually enlarge the projection image displayed on each display unit and projects these images on the eye of an observer. In any of these devices, image signals representing part of the projection image are transmitted to each display unit so as to compose a single image in its entirety.

These devices can provide a wide field of view and sharp and nearly identical images at any part of the image. Since these devices are provided with a single large lens or a plurality of lenses as an enlarging optical system, it is difficult to obtain a compact and light weight device desired for use as a head-mounted display device or a hand-held display device.

Furthermore, well-defined recognition of two points by an observer is restricted to within a narrow range encompassing the main viewpoint, such that even when displaying an image with a wide viewing angle an observer cannot clearly perceive the entire image. Although it is unnecessary to sharply see the entire image in order to increase the sense of realism, conventional devices increase the size and weight of the device in order to clarify these unnecessary ranges.

SUMMARY OF THE INVENTION

In view of these previously mentioned disadvantages, an object of the present invention is to provide a projection image display device both compact and light weight and providing an image in a wide field of view.

These objects are attained by a projection image display device comprising a first display unit for displaying a first image based on a first image signal; an enlarging optical system for enlarging the first image and projecting the first image to the eye of an observer; and a second display unit disposed for displaying a second image based on a second image signal and directly projecting second image to the eye of an observer.

This projection image display device is provided with a first display unit and a second display unit, and is capable of providing a projection image representing a wide range by using the first image signal and the second image signal supplied by the first and second display units as signals representing adjacent parts within the same image. In this image, the part displayed by the first display unit is projected to the eye of an observer as a virtual image through the enlarging optical system, and the part displayed on the second display unit is projected as a real image directly to the eye of the observer.

The projection image of the first display unit viewed by the observer is positioned a suitable distance in front of the eye, and the projection image of the second display unit is projected nearby the first image such that the observed field of view is a wide field of view. At this time, the projection image of the second display unit is not sharply projected since there is a difference between the distance to the virtual image displayed by the first display unit and the distance to the real image displayed by the second display unit. However, this lack of sharpness in the projection image of the second display unit is not perceived as an unnatural image by the observer who is focused on the projection image of the first display unit. Accordingly, the observer perceives a high sense of realism similar to when the projection image of the first display unit and the projection image of the second display unit are positioned at equal distances.

Since the enlarging optical system directs only the light of the projection image of the first display unit to the eye of the observer, a small diameter lens, or a single lens may be used. Accordingly, the projection image display device can be compact and light weight. The second display unit may comprise two or more units, such that the field of view may be increased by using more display units.

Image signal control means may be provided in the projection image display device to control one or both of the first image signal and second image signal so as to project the projection image of the first display unit and the projection image of the second display unit at identical size to the eye of an observer. Furthermore, image signal control means may be provided to control one or both of the first image signal and second image signal so as to project the projection image of the first display unit and the projection image of the second display unit at identical brightness to the eye of an observer.

If the first image signal and the second image signal are not subjected to any image processing, differences are generated in the size and brightness of the images of the first and second display units projected to the observer in accordance with the size of the display surface of both display units, and the magnification ratio of the enlarging optical system. The image signal control means can prevent this difference from being generated by linking the size and brightness of part of an image displayed on the first display unit and part of an image displayed on the second display unit so as to obtain a natural projection image.

BRIEF DESCRIPTION OF THE DRAWINGS

These and other objects and features of this invention will become clear from the following description taken in conjunction with the preferred embodiments with reference to the accompanying drawings, in which.

DETAILED DESCRIPTION OF THE PREFERRED EMBODIMENTS

Figure 1:
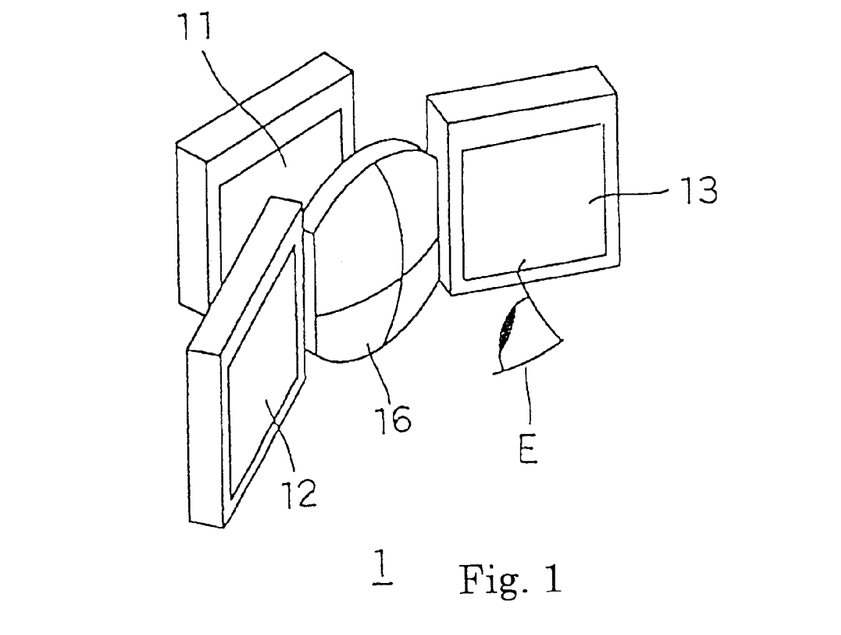
FIG. 1 is a perspective view showing the construction of the optical system of the projection display device of a first embodiment.

The projection image display device of the present invention is described hereinafter with reference to the accompanying drawings. FIG. 1 shows the construction of the optical system of the projection image display device of the first embodiment. The projection image display device 1 is provided with three liquid crystal displays (LCD) 11, 12, 13, and an enlarging lens 16 comprising a convex lens. The projection image display 1 is constructed as a head-mounted display (HMD) to be worn on the head of an observer, and the LCDs 11, 12, 13, and the enlarging lens 16 are housed in a body not shown in the drawing which blocks external light from entering. When used, the body of the device is positioned in front of the face of the observer, and LCD 11 is positioned in front of the eye E of the observer.

The enlarging lens 16 is disposed so as to match the optical axis with the line of sight of the observer looking directly at the front surface, and LCD 11 is arranged so as to have the optical axis of the enlarging lens cross the display surface in the center of the display surface. The LCD 12 and LCD 13 are respectively disposed to the left and right sides of the enlarging lens 16, and are inclined relative to the optical axis of the enlarging lens 16 so as to have the display surfaces face toward the eye E of the observer.

The projection image displayed on LCD 11 passes through the enlarging lens 16 and reaches the eye E of the observer. The projection image displayed on the LCDs 12 and 13, on the other hand, are directly projected to the eye E of the observer because there is no optical unit interposed between the eye E and the LCDs 12 and 13. The observer views the enlarged virtual image of the image displayed on the LCD 11 far from the LCD 11, and views the real images of the projection images displayed on the LCDs 12 and 13 adjacent to the virtual image.

Figure 2:
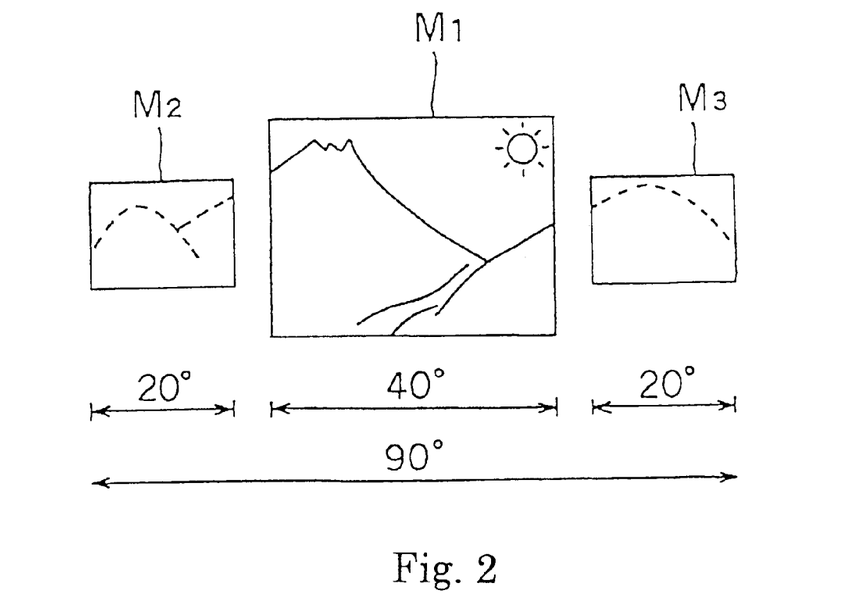
FIG. 2 shows examples of settings for the viewing angle of each image, and the positional relationship of three projection images projected to the eye of an observer by the projection image display device of the first embodiment.

The positional relationship of the projection images of the LCDs 11, 12, and 13 projected at the eye E of the observer, and an example of the settings for the field of view angles of each projection image are shown in FIG. 2. In this example, the angle of field in the horizontal direction of the projection images M2 and M3 of the LCDs 12 and 13 is approximately 20°, and the display surfaces of the LCDs 11, 12, and 13 are the same size. The magnification of the enlarging lens 16 is 2x, and the angle of field in the horizontal direction of the projection image M1 of the LCD 11 is approximately 40°. A gap is provided between the projection image M1 of the LCD 11 and the projection images M2 and M3 of the LCDs 12 and 13 due to the frame circumscribing the display surface of the LCDs 12 and 13. The field angle of this gap is approximately 5°, such that at the current settings the total field angle in the horizontal direction is approximately 90°.

The angle of field of approximately 40° of the projection image M1 of LCD 11 is more than double the angle of field at which an observer can clearly recognize two points (hereinafter approximately 20°), such that the projection image M1 is clearly seen even when the observer moves the line of sight approximately 20° laterally from true front. The gap between the projection image M1 and the projection images M2 and M3 is not distinctly recognized by the observer because the gap is removed from the center of the projection image M1, and there is no light present in the area circumscribing the projection images M1, M2, M3.

Image signals representing part of a wide range projection image are transmitted to the LCD 11, and image signals representing adjacent part to the right and left of the image displayed on LCD 11 are transmitted to the LCDs 12 and 13. Accordingly, the projection images M1, M2, M3 of the LCDs 11, 12, 13 comprise the entirety of a single wide range projection image.

The distance from the eye E to the virtual image of the projection image M1 of the LCD 11, and the distance to the real images of the projection images M2 and M3 are different, and an observer cannot clearly see both the projection image M1 and the projections images M2 and M3 at the same time. Normally, the projection image the observer focuses on is part of the projection image M1 of the LCD 11 positioned at true front, and the projection images M2 and M3 are not sharply projected to the eye E because the images M2 and M3 are beyond the field of view range at which two points can be distinguished, even if, for example, the projection image M2 and the projection image M3 were positioned at the same distance as the projection image M1. Therefore, an observer is not particularly aware of an unnatural image due to the difference in the distance to the projection images M2 and M3 and the distance to the projection image M1.

In order for an observer to clearly see a projection image beyond the range of the projection image of the LCD 11, the direction of the head of the observer may be detected, so as to change the content of the projection image displayed on the LCDs 11, 12, and 13 in accordance with the detected direction. This method has already been practicalized in head-mounted displays.

Figure 3:
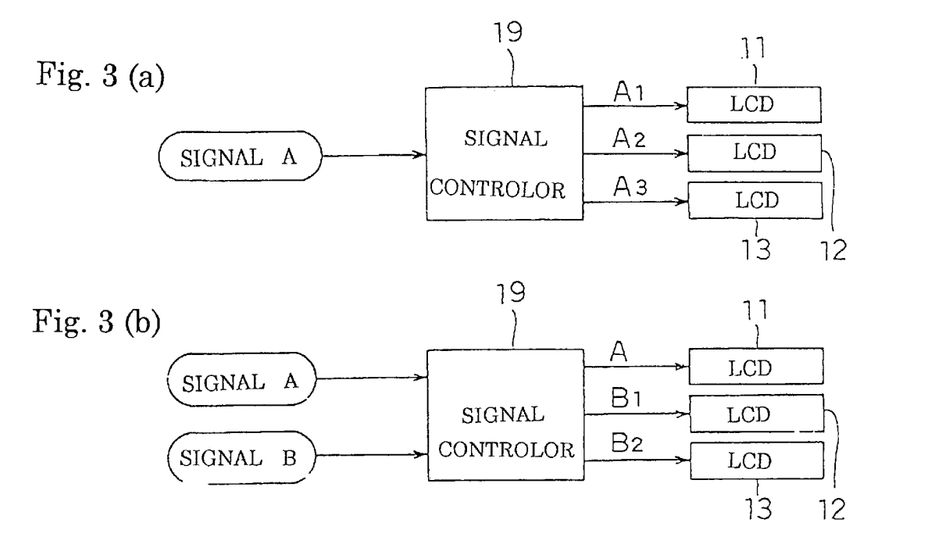
FIG. 3 shows the image signal path to the LCD in the projection image display device of the first embodiment.

The transmission of the image signals to the LCDs 11, 12, and 13 is accomplished by a signal controller 19, as shown in FIG. 3. FIG. 3(a) shows one image signal A transmitted to the signal controller 19, and from this signal are extracted image signals A1, A2, A3 corresponding to three different image regions, and these three signals are transmitted to the LCDs 11, 12, 13, respectively.

FIG. 3(b) shows two image signals A and B transmitted to the signal controller 19, and the image signal A is transmitted to the LCD 11, and from the image signal B are extracted image signals B1 and B2 corresponding to two different image regions, and these two signals are transmitted to the LCDs 12 and 13, respectively. This construction is suitable when displaying images of different regions taken by different cameras, and when displaying a combination of different types of images as in combining an image taken by camera and a computer-generated image.

In order for an observer to have a high sense of realism, there must be no difference in the size and brightness of the projection image enlarged on the LCD 11 and the projection images which are not enlarged. For this reason the image controller 19 processes one or both the image signals transmitted to the LCD 11 and the image signals transmitted to the LCDs 12 and 13 based on the magnification of the enlarging lens 16 and the size of the display surfaces of the LCDs 11, 12, 13, so as to set the size and brightness of the projection images on the display surfaces of each LCD 11, 12, 13.

Figure 4:
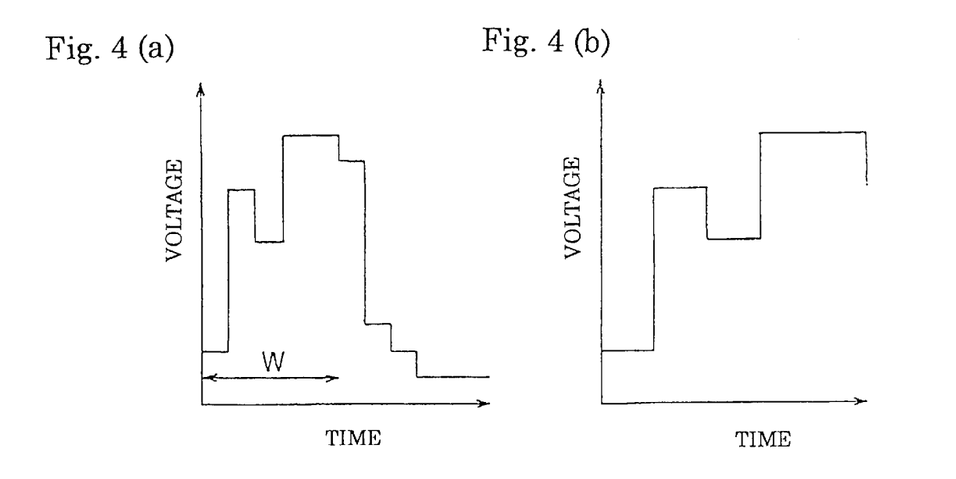
FIG. 4 shows examples of image signal processing for managing the size of the projection image in the aforesaid projection image display device.
Figure 5:
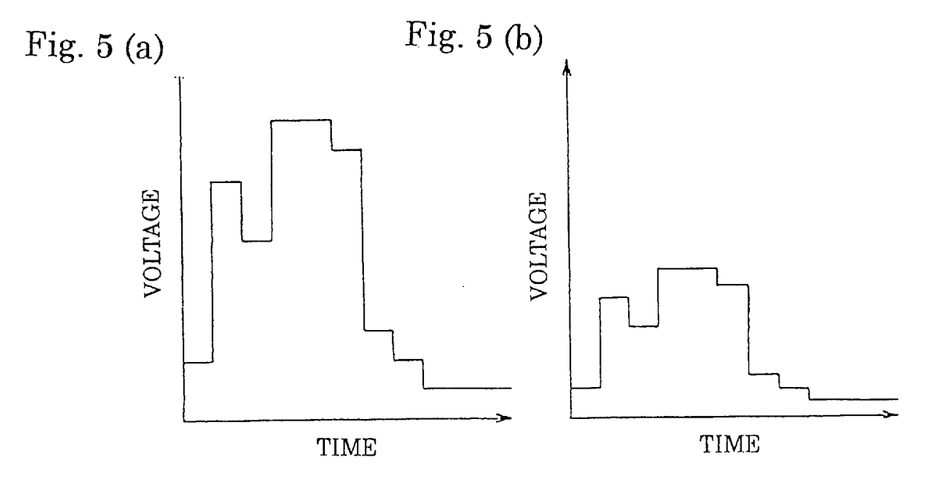
FIG. 5 shows examples of image signal processing for managing the brightness of the projection image in the aforesaid projection image display device.

FIGS. 4 and 5 respectively show examples signal processing when a projection image is enlarged on the display surface and when brightness of the projection image is reduced. In the drawings, (a) is the image signal transmitted to the signal controller 19, and (b) is the processed image signal output from the image controller 19. The example of FIG. 4 enlarges the projection image 2x in the horizontal direction by extracting the signal from range W, and doubling the output time of this signal. When enlarging the vertical direction 2x, the signal of (b) may be output twice. The example of FIG. 5 reduces the output signal to ½, to reduce the brightness of the projection image to one half.

The signal controller 19 sets the size and brightness of the image projected to the observer so as to be equal for the LCD 11 and the LCDs 12 and 13 by means of the aforesaid processing. An observer views a natural projection image linked by size and brightness. If the LCD 11 is a high resolution display, details of the sharp projection image are improved and the sense of realism is enhanced.

Figure 6:
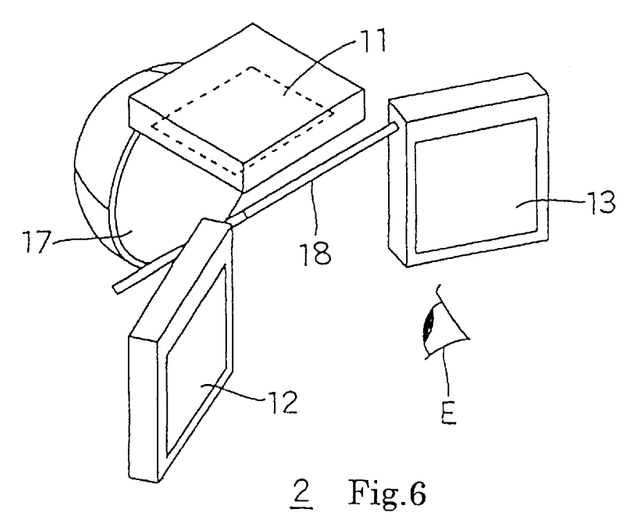
FIG. 6 is a perspective view showing the construction of the optical system of the projection image display device of a second embodiment.

FIG. 6 shows the construction of the optical system of the projection image display device 2 of a second embodiment. The projection image display device 2 is provided with an enlarging optical system comprising a concave mirror 17 and a half-mirror 18 in place of the enlarging optical system 16 used in projection image display device 1. The concave mirror 17 is arranged so that the line of sight of the observer looking to true front matches the optical axis, and the half-mirror 18 is arranged at an inclination of 45° relative to the optical axis of the concave mirror 17.

The LCD 11 is provided above the half-mirror 18 and horizontal to the optical axis of the concave mirror 17. The LCDs 12 and 13 are arranged on either side of and adjacent to the half-mirror 18. The LCDs 12 and 13 are inclined relative to the optical axis of the concave mirror 17 so that the display surfaces face the eye E of an observer.

The light of the projection image of the LCD 11 enters the half-mirror 18, and part of the light is reflected and enters the concave mirror 17. The light entering the concave mirror 17 is reflected and converges on the half-mirror 18, and part of the light is transmitted therethrough and enters the eye E of the observer. The observer views the enlarged virtual image of the projection image displayed on the LCD 11, from a distance from the concave mirror 17, and views the real images of the projection images displayed on the LCDs 12 and 13 adjacent thereto.

In the projection image display device 2, processing of the image signals to manage the size and brightness of the image projected to an observer is accomplished based on the size of the display screens of the LCDs 11, 12, 13, the magnification of the concave mirror 17, and the reflectivity of the half-mirror 18.

Figure 7:
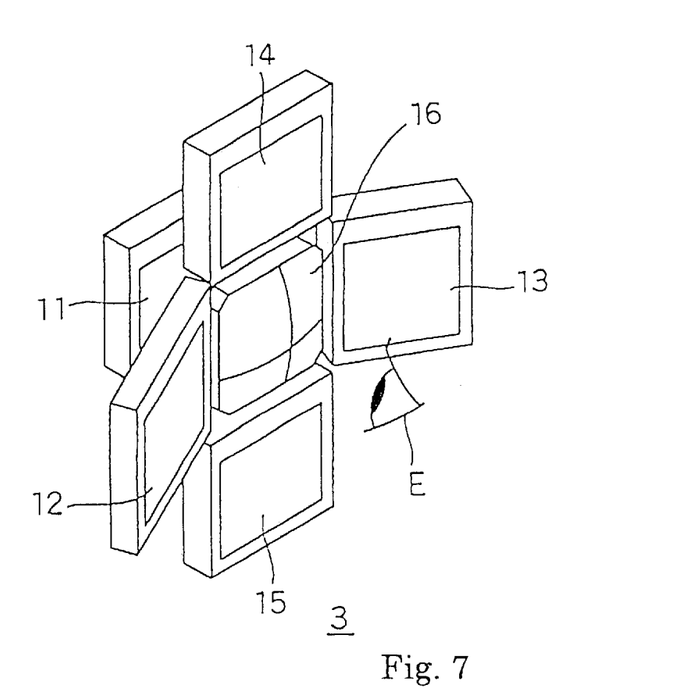
FIG. 7 is a perspective view showing the construction of the optical system of the projection image display device of a third embodiment.

FIG. 7 shows the construction of an optical system of the projection image display device 3 of a third embodiment. The projection image display device 3 adds two LCDs 14 and 15 to the projection image display device 1 of the first embodiment. The LCDs 14 and 15 are respectively arranged above and below the enlarging lens 16, and adjacent to the enlarging lens 16. The images displayed on the LCDs 14 and 15 are directly projected to the eye E of an observer because no optical unit is interposed between the LCDs 14 and 15 and the eye E.

The projection image display device 3 provides a wide field of view image in a vertical direction via the LCDs 14 and 15. In this instance, LCDs 14 and 15 are arranged such that the display surfaces are perpendicular to the optical axis of the concave mirror 17, and the display surfaces also may be inclined toward the eye E of the observer as are the LCDs 12 and 13.

Figure 8:
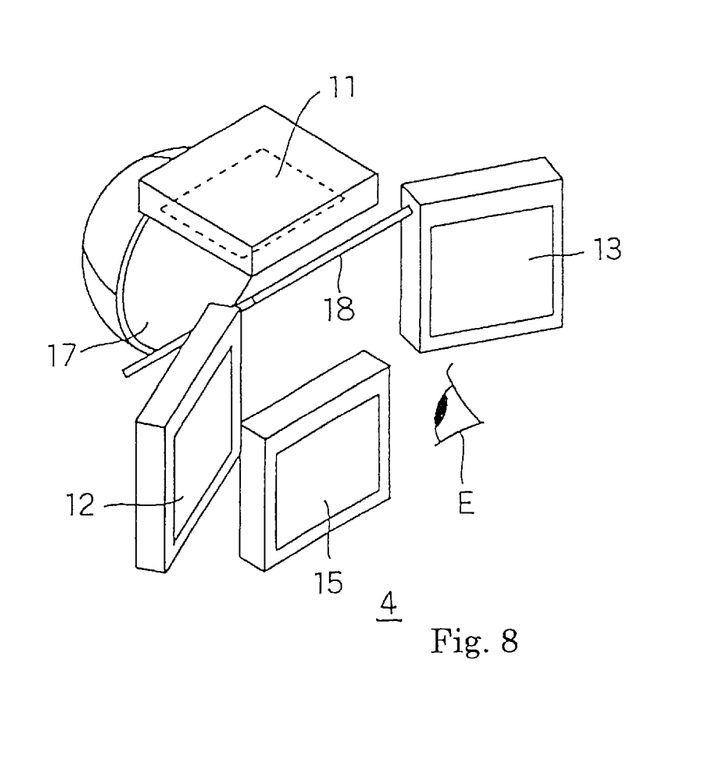
FIG. 8 is a perspective view showing the construction of the optical system of the projection image display device of a fourth embodiment.

FIG. 8 shows the construction of the optical system of projection image display device 4 of a fourth embodiment. Projection image display device 4 adds an LCD 15 to the projection image display device 2 of the second embodiment. LCD 15 is arranged below the half-mirror 18. The image displayed on the LCD 15 is directly projected to the eye E because no optical unit is interposed between the LCD 15 and the eye E. Providing the PCD 15 allows the projection image display device 4 to increase the field of view in the vertical direction.

Figure 9:
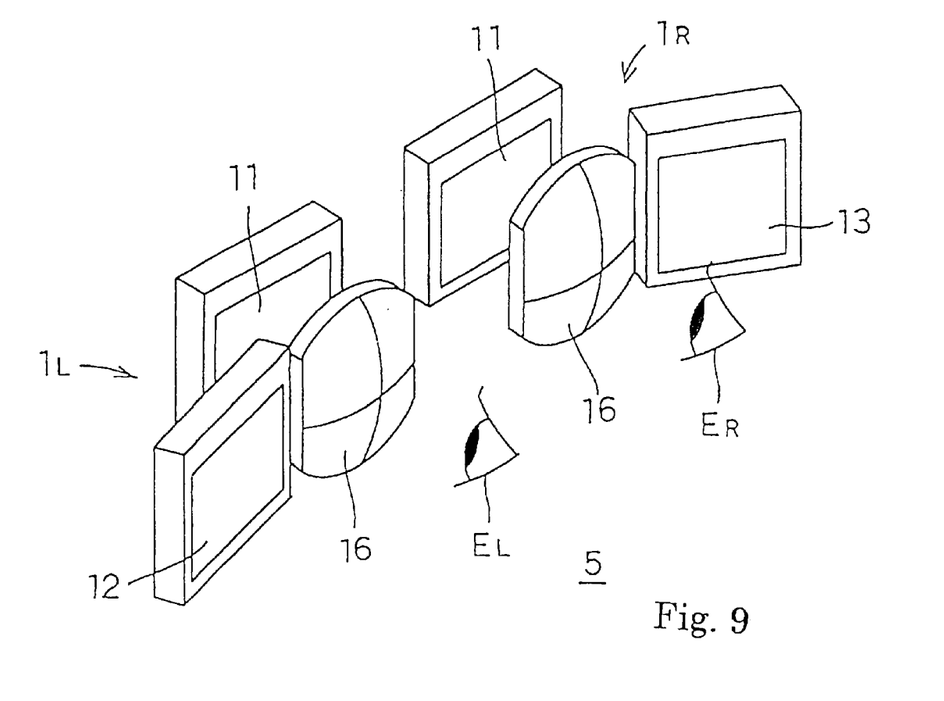
FIG. 9 is a perspective view showing the construction of the optical system of the projection image display device of a fifth embodiment.

The projection image display devices 1–4 of the first through fourth embodiments may be provided one for each eye of an observer using the constructions as is. FIG. 9 shows a modification of the construction of the optical system of the projection image display device 5 of the fifth embodiment. This projection image display device 5 combines a block 1L eliminating the LCD 13 from the projection image display device 1 of the first embodiment and a block 1R eliminating the LCD 12 of the projection image display device 1. The block 1L provides an image to the left eye EL of the observer, and the block 1R provides an image to the right eye ER. In this construction, since there is no LCD between the left and right blocks 1L and 1R to cause concern about collision, each structural unit can be enlarged so as to increase the field of view.

The projection image display device of each of embodiments restricts increase of size and weight of the device by providing an enlarging optical system only for a first display unit that displays a projection image on which an observer is focused, and is capable of displaying wide field of view projection images on the first and second display units. The device is therefore compact and light weight and suitable for use as a head-mounted display and hand-held display.

In particular, a natural image is produced without an observer being aware of different parts of the image being displayed by different display units, in a construction that provides a signal controlling means for controlling image signals such that the projection image of a first display unit and the projection image of a second display unit projected to the eye of an observer are of identical size and brightness.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A projection image display device comprising:
   a first display unit for displaying a first image based on a first image signal;
   an enlarging optical system for enlarging the first image and projecting the first image to an eye of an observer;
   a second display unit for displaying a second image based on a second image signal and directly projecting the second image to the eye of the observer; and
   an image signal controller that controls one or both of the first image signal and the second image signal so as to project the first image and the second image at identical size to the eye of the observer, wherein the first and second images are viewed by the observer's eye at the same time.

2. A projection image display device claimed in claim 1, wherein the enlarging optical system is provided so as to match an optical axis with the line of sight of the observer.

3. A projection image display device claimed in claim 1, wherein the first display unit is arranged so as to have an optical axis of the enlarging optical system cross a display surface of the first display unit in a center of the display surface.

4. A projection image display device claimed in claim 1, wherein the enlarging optical system includes an eyepiece lens element.

5. A projection image display device claimed in claim 1, wherein the enlarging optical system includes a concave mirror.

6. A projection image display device claimed in claim 1, further comprising:
an image brightness signal controller that controls one or both of the first image signal and second image signal so as to project a projection image of the first display unit and a projection image of the second display unit at identical brightness to the eye of the observer.

7. A method of displaying images to an eye of an observer, comprising:
displaying a first image on a first display unit based on a first image signal;
projecting the first image to an enlarging optical system such that an eye of an observer can view an enlargement of the first image via the enlarging optical system;
displaying a second image on a second display unit based on a second image signal;
projecting the second image directly to the eye of the observer; and
controlling one or both of the first image signal and the second image signal so as to project the first image and the second image at an identical size to the eye of the observer, wherein the first and second images are viewed by the observer's eye at the same time.

8. The method of claim 7, further comprising controlling one or both of the first image signal and the second image signal so as to project a projection image of the first display unit and a projection image of the second display unit at identical brightness to the eye of the observer.

9. The method of claim 7, wherein the enlarging optical system is arranged such that an optical axis of the enlarging optical system matches the line of sight of the eye of the observer.

10. The method of claim 7, wherein the enlarging optical system is arranged such that an optical axis of the enlarging optical system crosses a display surface of the first display unit in a center of the display surface.

11. The method claim 7, wherein the enlarging optical system includes an eyepiece lens element.

12. The method of claim 7, wherein the enlarging optical system includes a concave mirror.

13. A projection image display device to be positioned in front of the face of an observer, comprising:
a first display unit for displaying a first image based on a first image signal;
a first enlarging optical system for enlarging the first image and projecting the first image to a first eye of an observer;
a second display unit for displaying a second image based on a second image signal and directly projecting the second image to the first eye of the observer;
a body that supports the first display unit, the second display unit, and the first enlarging optical system, wherein the body is configured to be positioned in front of the face of the observer; and
an image signal controller that controls one or both of the first image signal and the second image signal so as to project the first image and the second image at identical size to the first eye of the observer, wherein the first and second images are viewed by the observer's eye at the same time.

14. A projection image display device as claimed in claim 13, further comprising:
image brightness signal control means for controlling one or both of the first image signal and the second image signal so as to project a projection image of the first display unit and a projection image of the second display unit at identical brightness to the eye of the observer.

15. A projection image display device as claimed in claim 13, wherein the first enlarging optical system is provided so as to match an optical axis with a line of sight of the observer.

16. A projection image display device as claimed in claim 13, wherein the first display unit is arranged so as to have an optical axis of the first enlarging optical system cross a display surface of the first display unit in a center of the display surface.

17. A projection image display device as claimed in claim 13, wherein the first enlarging optical system includes an eyepiece lens element.

18. A projection image display device as claimed in claim 13, wherein the first enlarging optical system includes a concave mirror.

19. A projection image display device to be positioned in front of the face of an observer, comprising:
a first display unit for displaying a first image based on a first image signal;
a first enlarging optical system for enlarging the first image and projecting the first image to a first eye of an observer;
a second display unit for displaying a second image based on a second image signal and directly projecting the second image to the first eye the observer;
a third display unit for displaying a third image based on a third image signal;
a second enlarging optical system for enlarging the third image and projecting the first third image to a second eye of an observer;
a fourth display unit for displaying a fourth image based on a fourth image signal and directly projecting the fourth image to the second eye the observer; and
a body that supports the first display unit, the second display unit, the third display unit, the fourth display unit, the first enlarging optical system and the second enlarging optical system, and wherein the body is configured to be positioned in front of the face of the observer, wherein the first, second, third, and fourth images are viewed by the observer's eyes at the same time.

20. A projection image display device comprising:
a first display unit for displaying a first image based on a first image signal;
an enlarging optical system for enlarging the first image and projecting the first image to an eye of an observer;
a second display unit for displaying a second image based on a second image signal and directly projecting the second image to the eye of the observer; and
image signal control means for controlling one or both of the first image signal and the second image signal so as to project the first image and the second image at identical size to the eye of the observer, wherein the first and second images are viewed by the observer's eye at the same time.

21. A projection image display device claimed in claim 20, further comprising:
image brightness signal control means for controlling one or both of the first image signal and the second image signal so as to project image of the first display unit and a projection image of the second display unit at identical brightness to the eye of the observer.

22. A projection image display device comprising:

a first display unit for displaying a first image based on a first image signal;

an enlarging optical system for enlarging the first image and projecting the first image to an eye of an observer; and a second display unit for displaying a second image based on a second image signal and directly projecting the second image to the eye of the observer, wherein the first and second image signals representing adjacent parts of a wide range image are transmitted to the first and second displays, respectively, and thereby the first and second images compose an entirety of the wide range image.

23. A projection image display device to be positioned in front of the face of an observer, comprising:

a first display unit for displaying a first image based on a first image signal;

a first enlarging optical system for enlarging the first image and projecting the first image to a first eye of an observer;

a second display unit for displaying a second image based on a second image signal and directly projecting the second image to the first eye of the observer; and a body that supports the first display unit, the second display unit, and the first enlarging optical system, wherein the body is configured to be positioned in front of the face of the observer, and wherein the first and second image signals representing adjacent parts of a wide range image are transmitted to the first and second displays, respectively, and thereby the first and second images compose an entirety of the wide range image.

* * * * *